United States Patent [19]
Kajikawa

[11] Patent Number: 5,203,498
[45] Date of Patent: Apr. 20, 1993

[54] HOT WATER TYPE HEAT EXCHANGE DEVICE

[75] Inventor: Yoshiharu Kajikawa, Hekinan, Japan
[73] Assignee: Nippondenso Co., Ltd., Kariya, Japan
[21] Appl. No.: 917,188
[22] Filed: Jul. 22, 1992
[30] Foreign Application Priority Data

Aug. 7, 1991 [JP] Japan .................. 3-197830

[51] Int. Cl.5 .......................................... G05D 23/00
[52] U.S. Cl. ................................ 237/2 A; 237/12.3 B
[58] Field of Search .................. 237/2 A, 8 C, 12.3 B, 237/12.3 A; 165/42, 43, 35

[56] References Cited

U.S. PATENT DOCUMENTS 4,974,664 12/1990 Glennon et al. ............... 237/2 A

FOREIGN PATENT DOCUMENTS 55-163209 11/1980 Japan .
2-63917 3/1990 Japan .
3-25263 2/1991 Japan .

Primary Examiner—Henry A. Bennet
Attorney, Agent, or Firm—Cushman, Darby & Cushman

[57] ABSTRACT

A heater core supplied with hot water by a cooling water recirculating passageway of an internal combustion engine, and having a plurality of parallel tubes arranged between first and second tanks. The heater core forms a first cooling water flow circuit for creating a U-shaped flow whereby the cooling water from the first tank is introduced into the second tank via a group of tubes and then introduced into the first tank via a different group of tubes, and a second cooling water flow circuit for creating a straight flow from the first tank and second tank. A flow switching valve is provided and is usually switched to the first cooling water flow circuit. Upon a drop in the engine rotational speed to an idling speed, wherein the amount of hot water supplied to the heater core is small, the second cooling water flow circuit creating a one-directional flow from the first tank to the second tank is selected, whereby the flow resistance is lowered, and accordingly, the amount of heat emitted from the heater core increased, to thus maintain a desired heating performance during the engine idling condition.

8 Claims, 8 Drawing Sheets

HOT WATER TYPE HEAT EXCHANGE DEVICE

BACKGROUND OF THE INVENTION

1. Field of the Invention

The present invention relates to a hot water type heat exchange apparatus, such as a heater core or radiator, able to be connected to a water pump driven by an internal combustion engine.

2. Description of the Related Art

Japanese Utility Model Publication 55-163209 discloses a switchable heater core having a first cooling water circuit for obtaining a U-shaped flow of hot water, a second cooling water circuit for obtaining a one directional flow of hot water, and a thermo-sensitive valve for switching between the first and the second circuits in response to the temperature of the hot water.

In this prior art heater core, the amount of hot water supplied to the heater core is determined from a point at which the hot water supply performance by a water pump driven by an internal combustion engine and the flow resistance through the heater core are balanced. Namely, under a low engine rotational speed condition, such as an idling condition of the engine, the amount of hot water supplied to the heater core is reduced, and this causes the amount of heat emitted at the heater core to be reduced.

SUMMARY OF THE INVENTION

An object of the present invention is to provide a heat exchange system capable of preventing a reduction in the amount of heat emitted when the engine is under a low speed condition.

According to the present invention, a hot water type heat exchange device is provided, which device is connected to an internal combustion engine having a cooling water recirculating system provided with a water pump for recirculating a cooling water, said device comprising:

a first tank;
a second tank;
a plurality of tubes for allowing a passage of hot water therethrough, each having first and second ends; the first ends of the tubes being connected to the first tank, and the second ends of the tubes being connected to the second tank;

flow direction control means for switching between a first cooling water flow circuit wherein the cooling water from the recirculating system is introduced into the first tank, then into the second tank via a group of the tubes, and then reintroduced into the first tank via a remaining group of tubes, and finally returned to the recirculating system, and a second cooling water flow circuit wherein the cooling water from the recirculating system is introduced into the first tank, and then into the second tank via all of the tubes, and finally returned to the recirculating system;

means for detecting information related to an amount of the engine cooling water flowing from the water pump, and;

means for executing the switching by said flow direction control means between the first cooling water flow circuit and the second cooling water flow circuit in response to the detected information related to the amount of the engine cooling water.

According to the present invention, the hot water heat exchanger is provided with first and second cooling water flow circuits, which are used in accordance with information related to the amount of hot water flowing from the engine, such as the engine rotational speed or flow amount itself, for controlling the flow resistance to a desired value. Namely, when the first flow circuit is used, the engine cooling water in the first tank from the engine is introduced into the second tank via a group of tubes, and returned via a remaining group of tubes to the first tank and the engine recirculating passageway, i.e., a U-shaped flow is obtained in the heater core. As a result, an increase in the flow resistance at the heat exchanger is obtained, whereby the speed of the flow of the water is increased to thus increase the amount of heat emitted when the engine is operating under a condition in which a large amount of hot water from the engine is introduced into the heat exchanger.

When the second flow circuit is used, the engine cooling water in the first tank from the engine is introduced into the second tank via all of the tubes, and then returned to the engine recirculating passageway. Namely, a one directional flow is obtained in the heater core. As a result, a decrease in the flow resistance at the heat exchanger is obtained, whereby the speed of the flow of the water is decreased, to thus increase the amount of heat emitted when the engine is operating under a condition in which a small amount of hot water from the engine is introduced into the heat exchanger.

Such a decrease of the flow resistance in accordance with the amount of hot water supplied from the engine to the heater core provides a higher efficiency when the engine is operating under a low rotational speed condition.

DESCRIPTION OF THE PREFERRED EMBODIMENTS

Figure 1:
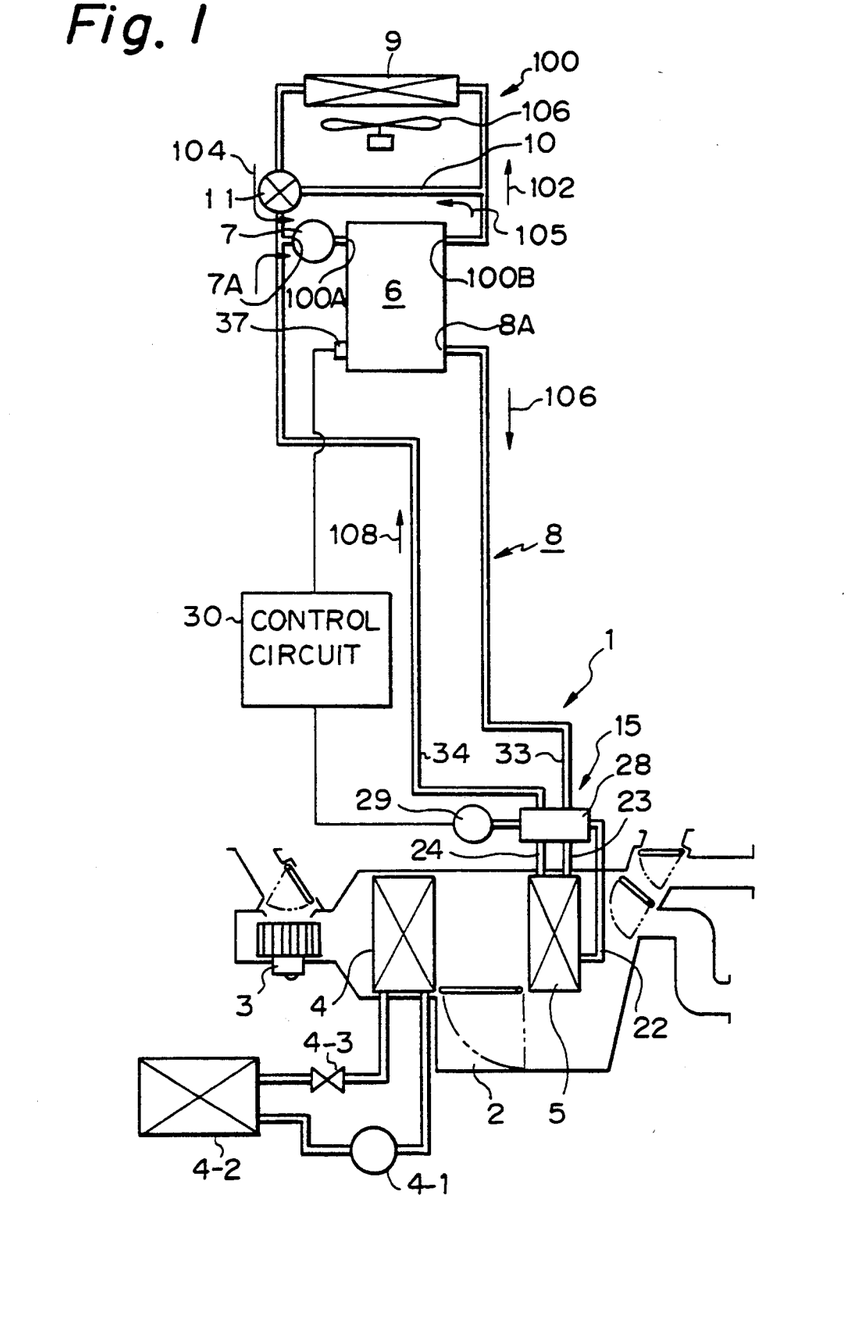
FIG. 1 shows a general view of an air conditioning system for an automobile provided with a hot water type heat exchange device according to the present invention.

Embodiments of the present invention are now described with reference to the attached drawings FIGS. 1 to 6 show a first embodiment of the present invention. In FIG. 1, reference numeral 1 generally denotes an air conditioning system for an automobile. The air conditioning system 1 includes a duct 2 having a plurality of outlets (not shown) opened to respective locations in a cabin of the automobile for introducing thereto flows of air for air conditioning, a blower 3 arranged in the duct 2 for generating a forced flow of air directed to the air outlets, a cooling medium evaporator 4 subjected to a heat exchange with the air passing through the duct 2, for cooling the air, and a heater core 5 for heating the cooled air flowing from the evaporator 4 to a desired temperature. As is well known, the evaporator 4 is located in a refrigerating cycle for the refrigerating medium, which, in addition to the evaporator 4, is constructed by a compressor 4 - 1 driven by a crankshaft of the engine for obtaining a forced flow of the refrigerating medium from the evaporator 4, a condenser 4 - 2 downstream of the compressor 4 - 1 for obtaining a liquid state of the refrigerating medium, and an expansion valve 4 - 3 downstream of the condenser 4 - 2 for directing the refrigerating medium having a reduced pressure to the evaporator 4.

In FIG. 1, a reference numeral 6 is a water-cooled internal combustion engine produced with a water jacket. An engine water cooling passageway is generally shown by 100, and is connected to the water jacket in the engine 6 at a inlet port 100A and an outlet port 100B, whereby the engine cooling water is recirculated. Arranged in the cooling passageway 100 is a water pump 7 driven by the crankshaft (not shown) so that a flow of the engine cooling water in the passageway 100 is created, a radiator 9 subjected to a heat exchange with the outside air for cooling the engine cooling water from the engine 6, as shown by an arrow 102, and for returning it to the engine 6 as shown by an arrow 104, and a thermostat 11 for controlling the flow of the cooling water to a by-pass passageway 10, which is arranged to by-pass the radiator 9. When the temperature of the engine cooling water from the water pump 7 is higher than a predetermined value, the thermostat 11 closes the by-pass passageway 10 so that the cooling water is introduced into the radiator 9. Conversely, when the engine cooling water temperature falls below the predetermined value, the by-pass passageway 10 is opened, so that the engine cooling water by-passes the radiator 9, as shown by an arrow 105. A fan 106 is arranged to face the radiator 9.

A hot water passageway 8 is diverted from the engine water passageway in the engine 6 at an outlet port 8A, and is connected to the water pump 7 at an inlet port 7A thereof. The heater core 5, which is a hot water type heat exchange apparatus according to the present invention, is located in the hot water passageway 8. As a result, the hot water flows into the passageway 8 toward the heater core 5, as shown by an arrow 106, and after passing through the heater core 5, the water is returned via the passageway 8, as shown by an arrow 108, into the engine via the water pump 7. Since the water pump 7 is connected to the crankshaft of the engine 6, a low engine speed reduces the amount of the engine cooling water in the passageways 8 and 100, and a high engine speed increases the amount of the cooling water in the passageway 8 and 100.

Figure 2:
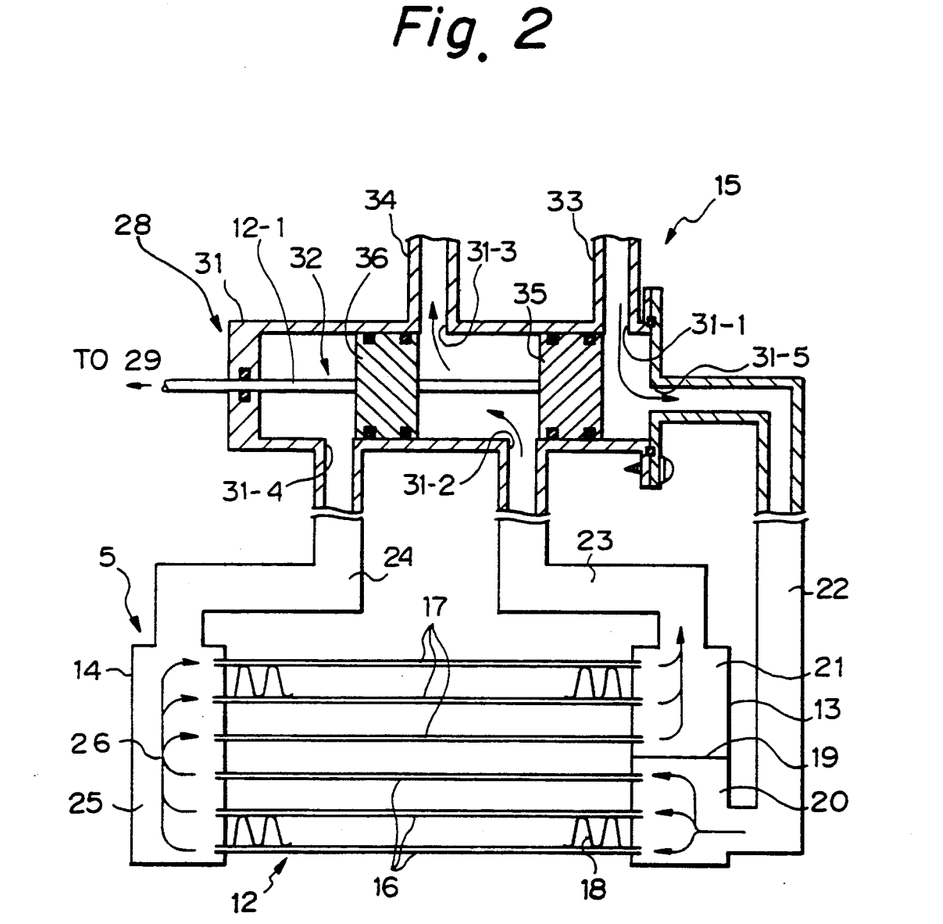
FIG. 2 shows details of the heat exchange device according to the present invention.

A construction of the heater core 5 will now be explained. In FIG. 2, the heater core 5 in this embodiment is basically constructed by a plurality of parallel heat exchange tubes 12 through which the engine cooling water flows, and arranged so that the outer surfaces thereof are in contact with the air from the evaporator 4, for heating same, a first tank 13 to which the first ends of heat exchange tubes 12 are connected by, for example, soldering, a second tank 14 to which the second ends of the heat exchange tubes 12 are connected by, for example, soldering, and a change-over device 15 for switching the flow of the engine cooling water in the heater core 5. Corrugated shaped fins 18 are arranged between each adjacent tubes 12 such that the fins 18 are connected to the outer surfaces of the respective tubes 12 by, for example, soldering.

The heat exchange tubes 12 are formed into a first group 16 of three tubes 12 located on the lower side of the heater core, and a second group 17 of three tubes 12 located on the upper side of the heater core. The first tank 13 is provided with a partition 19, for dividing the space in the tank 13 into a first chamber 20 and a second chamber 21. The first group 16 of the heat exchange tubes 12 is open to the first section 20 at one end, and connected to the switching device 15 via a first hot water pipe 22 at the other end. The second group 17 of the heat exchange tubes 12 is open to the second chamber 21 at one end, and connected to the switching device 15 via a second hot water pipe 23 at the other end. The second tank 14 defines therein a communication chamber 25, which is connected to one end of the heat exchange tubes 12 of the first and second groups 16 and 17, and is also connected to a third hot water return pipe 24.

As described later, the switching device 15 is switched between a position shown in FIG. 2, wherein a U-shape flow of the engine cooling water, as shown by arrows 26, from the first chamber 20 of the first tank 13 to the communication chamber 25 of the second tank 14 and then to the second chamber 21 of the first tank 13, and a position shown in FIG. 3, wherein a one directional flow, as shown by the arrow 27, from the first and second sections 20 and 21 of the first tank 13 to the communication chamber 25 of the second tank 14, are obtained.

Figure 3:
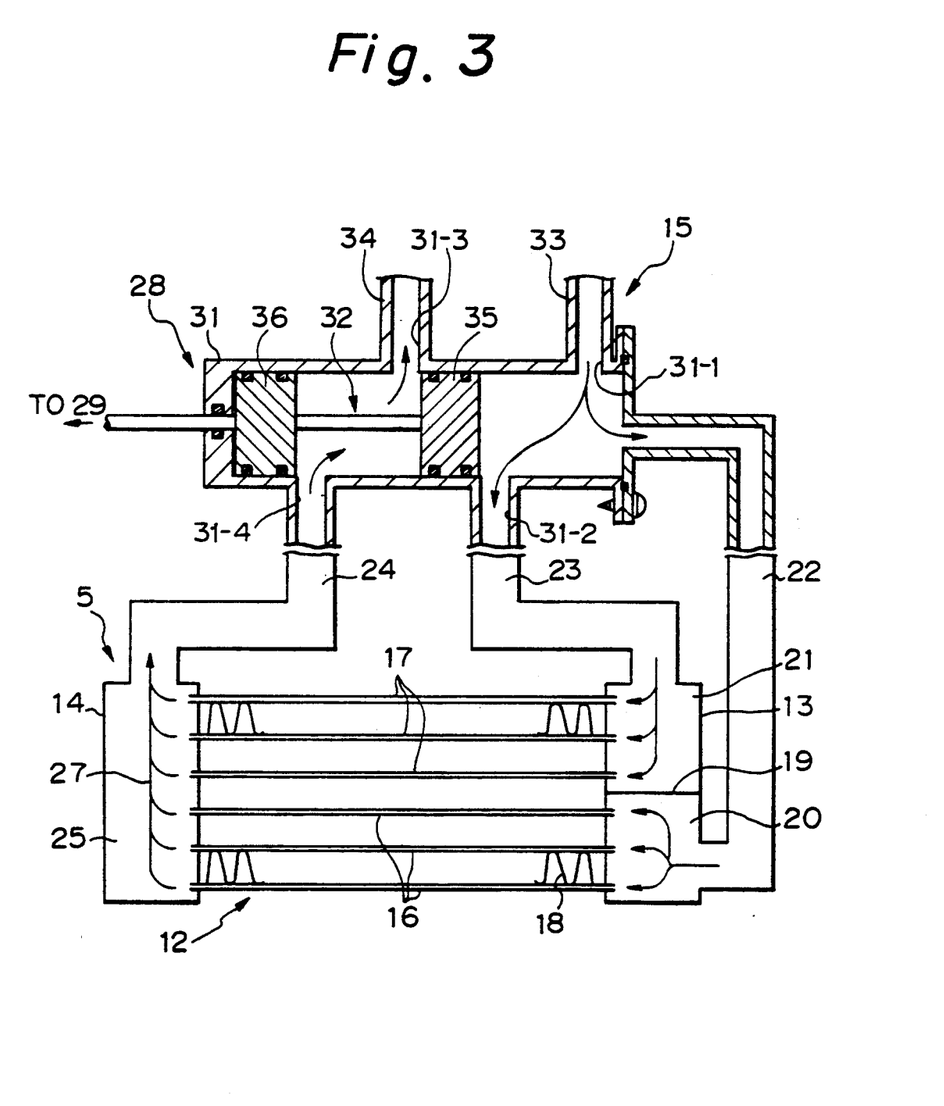
FIG. 3 is the same as FIG. 2, but shows the valve in a different position.

As shown in FIG. 1, the switching device 15 is basically constructed by a switching valve for switching between the first position at which the flow of cooling water in the first flow circuit 26 in FIG. 2 is created, and the second position at which the flow of cooling water in the second flow circuit 27 in FIG. 3 is created, an actuator 29 for moving the switching valve 28 between the first and second positions, and a control circuit 30 generating electric signals for operating the actuator 29.

As shown in FIG. 2, the switching valve 28 includes a cylindrical housing 31, and a valve unit 32. The cylindrical wall of the housing 31 is provided with a series of openings 31 - 1, 31 - 2, 31 - 3 and 31 - 4, and an end wall thereof is provided with an opening 31 - 5. The opening 31 - 1 is connected to an inlet pipe 33 in the passageway 8 running to the taking out port 8A of the water jacket; the opening 31 - 5 is connected to a first hot water pipe 22 to the bottom section 20 of the first tank 13; the opening 31 - 2 is connected to a second hot water pipe 23 from the upper section 21 of the first tank 13; the opening 31 - 3 is connected to a third hot water pipe 34 in the passageway 8 to the water pump 7; and the opening 31 - 4 is connected to a pipe 24 from the second tank 14. The valve unit 32 is constructed by first and second valve members (lands) 35 and 36, and a piston rod 32 - 1 to which the first and second valve members 35 and 36 are fixedly connected. When the valve units 32 is in a first position as shown in FIG. 2, at which the first land 35 is located between the openings 31 - 1 and 31 - 2 and the second land 36 is located between the opening 31 -

Figure 4:
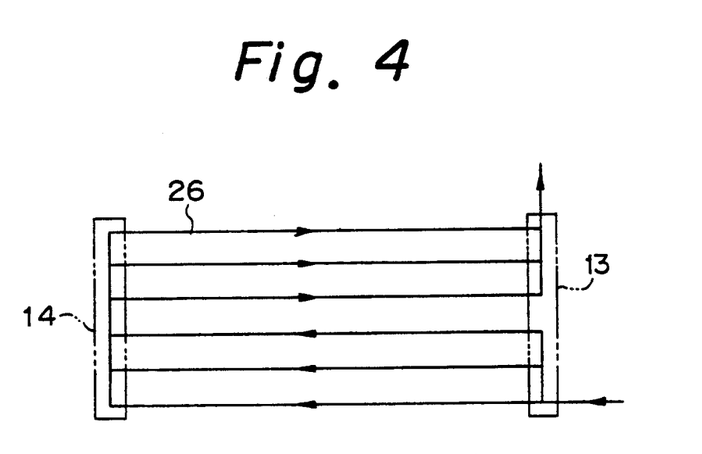
FIG. 4 schematically shows a flow direction for obtaining a U-shaped flow when the valve is in the position shown in FIG. 2.

3 and 31 - 4, the hot water introduction pipe 33 is connected to the first hot water pipe 22 running to the first chamber 20 of the first tank 13, and the second hot water pipe 23 from the second chamber 21 of the first tank 13 is connected to the hot water return passageway 34. In this first position of the valve unit 32, the third pipe 24 is blocked by the second land 36, so that the first U-shape flow circuit 26 is created from the first chamber 20 of the first tank 13 to the second tank 14, and then from the second tank 14 to the second chamber 21 of the first tank 21. This first U-shaped flow circuit 26 is schematically illustrated in FIG. 4.

Figure 5:
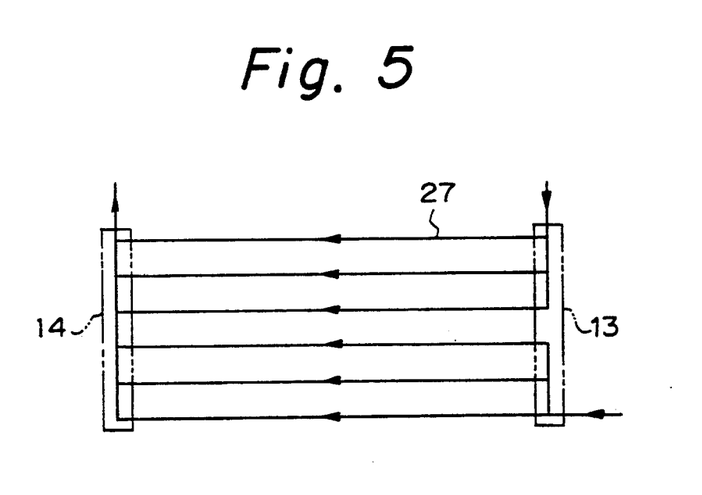
FIG. 5 schematically shows a flow direction for obtaining a one-directional flow when the valve is in the position shown in FIG. 3.

When the valve unit 32 is in the second position as shown in FIG. 3, at which the first land 35 is located between the openings 31 - 2 and 31 - 3 and the second land 36 is located on one side of the opening 31 - 4 adjacent to the inner end wall of the housing 31, the hot water introduction pipe 33 is connected to the first hot water pipe 22 and to the second hot water pipe 23, so that the hot water from the pipe 33 is introduced into the first chamber 20 and the second chamber 21 of the first tank 13. In this second position of the valve unit 32, the third pipe 24 is connected to the return pipe 34, so that the one directional flow circuit 27 as shown by the arrow 27 from the first and second sections 20 and 21 to the second tank 14 is created. This flow circuit 27 is schematically illustrated in FIG. 5.

A control circuit 30 operates the actuator 29 for controlling the position of the valve unit 32 in accordance with a signal from a sensor 37 detecting the rotational speed of the engine. Namely, the control circuit 30 issues an electric signal to the actuator 29 so that the valve unit 32 of the switching valve 28 takes the position as shown in FIG. 2 for obtaining the first flow circuit 26 of the hot water created in the heater core 5 when the engine rotational speed is higher than a predetermined value of, for example, 1150 revolutions per minute. Contrary to this, when the engine rotational speed is lower than the predetermined value of, for example, 1150 revolutions per minute, the control circuit 30 issues an electric signal to the actuator 29 for switching the valve unit 32 from the position shown in FIG. 2 to the position shown in FIG. 3, to create the second flow circuit 27 in the heater core 5.

Figure 6:
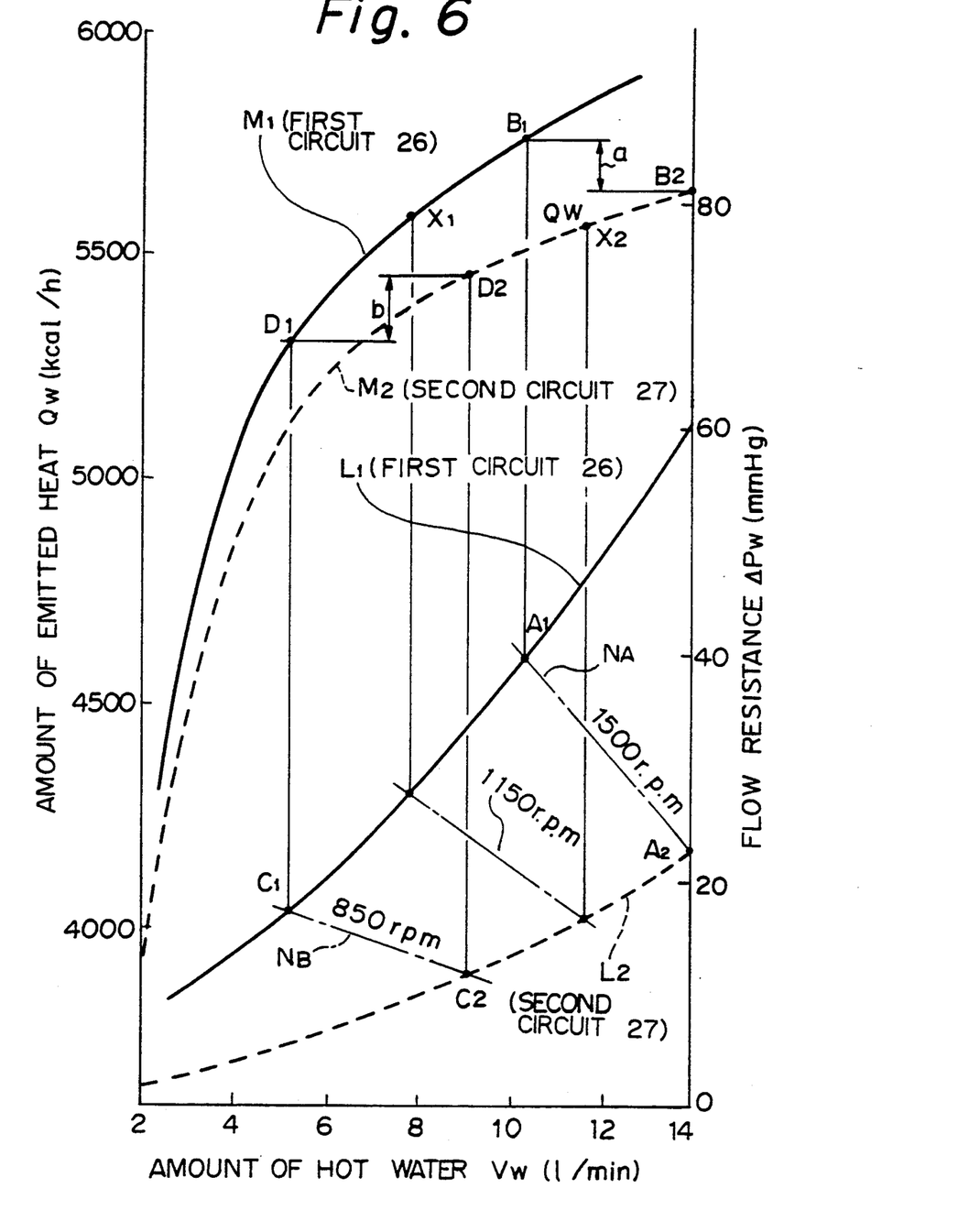
FIG. 6 shows relationship between the amount of hot water and the amount of heat emitted and the flow resistance for the two types of flows, i.e., the U-shaped flow (first circuit) and the one-directional flow (second circuit)

An operation of the air conditioning apparatus for an automobile according to the present invention will now be explained with reference to FIGS. 1 to 6. In FIG. 6, ordinates indicate the amount of radiated heat Qw (K cal/h) from the heater core 5 and a flow resistance $\Delta P_W$(mmHg) of the heater core 5, respectively, and an abscissa indicates a flow amount $V_W$(l/min) of the hot water in the hot water passageway 8. FIG. 6 illustrates points in accordance with the engine rotational speed at which the radiated heat amount and the flow resistance are balanced.

The control circuit 30 reads out the engine rotational speed from the engine rotational speed sensor 37, and when the engine rotational speed is, for example, equal to 1500 r.p.m., issues a signal to the actuator 29 so that the valve assembly 32 is moved to a position shown in FIG. 2. As a result, the lands 35 and 36 connect the hot water supply pipe 33 with the first hot water pipe 22, and the second hot water pump 23 with the hot water return pipe 34, and the third hot water pipe 24 is blocked, whereby the first flow circuit 26 shown in FIG. 4 is created in the heater core 5. Under this first flow circuit 26, the engine cooling water from the engine is introduced under pressure from the water pump 7 into the first chamber 20 of the first tank 13 via the hot water supply pipe 33, the flow direction switching valve 28, and the first hot water pipe 22. The hot water in the chamber 20 is introduced into the chamber 25 of the second tank 14 via the first group of the heat exchange tubes 16, and the hot water in the chamber 25 is introduced into the second chamber 21 of the first tank 13 via the second group of heat exchange tubes 17. The hot water in the second partition chamber 21 is sucked by the inlet port 7A of the water pump 7 via the second hot water pipe 23, the flow direction switching valve 28, and the hot water return pipe 34.

Under this condition, where the first flow circuit 26 is created in the heater core 5, the heater core 5 has a large flow resistance when the engine cooling water is passing therethrough, which increases the flow speed of the engine cooling water. Under an engine rotational speed higher than 1150 r.p.m., the selection of the first flow circuit 26 having a higher flow resistance provides a higher value of the amount of heat emission from the heater core 5 compared with the selection of the second flow circuit 27 for the following reason. In FIG. 6, a curve M is a relationship between the flow amount of the hot water and the amount of heat emitted when the first flow circuit 26 is selected, and a curve $M_2$ shows a similar relationship when the second flow circuit 27 is selected. A curve $L_1$ shows a relationship between the flow amount of the hot water and the flow resistance when the first flow circuit 26 is selected, and a curve $L_2$ shows a similar relationship when the second flow circuit 27 is selected. In FIG. 6, a curve $N_A$ shows a relationship between the amount of hot water from the engine and the flow resistance when the engine speed is maintained at 1500 r.p.m.; the curve $N_A$ shows that the higher the flow amount the lower the flow resistance. The curve $N_A$ can intersect with the curve $L_1$ at point $A_1$ and with the curve $L_2$ at point $A_2$. Namely, at the point $A_1$, the pressure of the engine water from the engine matches the pressure resistance when the first flow circuit 26 is selected, and at the point $A_2$, the pressure of the engine water from the engine matches the pressure resistance when the second flow circuit 27 is selected. Namely, when the first flow circuit 26 is selected, a flow amount of the engine cooling water at the point $A_1$ on the curve $L_1$ is obtained, and thus the amount of heat emitted at a point $B_1$ on the curve $M_1$, which corresponds to the point $A_1$ on the curve $L_1$, is obtained when the engine speed is 1500 r.p.m. Contrary to this, when the second flow circuit 27 is selected, a flow amount of the engine cooling water at the point $A_2$ on the curve $L_2$ is obtained, and thus the amount of heat emitted at a point $B_2$ on the curve $M_2$, which corresponds to the point $A_2$ on the curve $L_2$, is obtained when the engine speed is 1500 r.p.m. It will be easily understood that, when the engine speed is 1500 r.p.m., the selection of the first flow circuit 26 can obtain a heat emission amount at the point $B_1$ on the line $M_1$ that is larger, by an amount a, than the heat emission amount at the point $B_2$ on the curve $M_2$ obtained if the second flow circuit 27 were selected. As a result, an increased heating efficiency in the cabin of a vehicle can be obtained when the engine is running at a high speed, by selecting the first flow circuit 26.

When the engine rotational speed sensed by the engine rotational speed sensor 37 is lower than that obtained during the engine idling operation, for example, equal to 850 r.p.m., a signal is sent to the actuator 29 so that the valve assembly 32 is moved to a position shown in FIG. 3. As a result, the lands 35 and 36 connect the hot water supply pipe 33 with the first and second hot water pipes 22 and 23, and the third hot water pipe 24 is connected to the hot water return pipe 34, whereby the second flow circuit 27 shown in FIG. 5 is created in the heater core 5. In this second flow circuit 27, the engine cooling water introduced into the supply pipe 33 from the engine under pressure by the water pump 7 is introduced into the first and second chambers 20 and 21 of the first tank 13 via the first and second pipes 22 and 23, respectively, the hot water in the chamber 20 and 21 is introduced into the chamber 25 of the second tank 14 via the first and second group of the heat exchange tubes 16 and 17, respectively, and the hot water in the chamber 25 is sucked by the inlet port 7A of the water pump 7 via the third hot water pipe 24, the flow direction switching valve 28, and the hot water return pipe 34.

Where the second flow circuit 27 is created in the heater core 5, the heater core 5 has a low flow resistance when the engine cooling water passes there through, which lowers the flow speed of the engine cooling water. Under an engine rotational speed of as low as 850 r.p.m., the selection of the second flow circuit 27 having a lower flow resistance provides a higher value of the amount of heat emitted from the heater cores 5 than when the first flow passageway 26 is selected, for the following reason. Namely, as shown in FIG. 6, a curve $N_B$ shows a relationship between the amount of hot water from the engine and the flow resistance when the engine speed is maintained at 850 r.p.m. The curve $N_B$ shows, similar to the curve $N_A$ at 1500 r.p.m., that the higher the flow amount the lower the flow resistance, but this characteristic of the curve $N_B$ is milder than that of $N_A$. The curve $N_B$ can intersect the curve $L_1$ for the first flow circuit 26 at point $C_1$, and the curve $L_2$ for the second flow circuit 27 at point $C_2$. Namely, at point $C_1$, the pressure of the engine water from the engine matches the pressure resistance when the first flow circuit 26 is selected, and at the point $C_2$, the pressure of the engine water from the engine matches the pressure resistance when the second flow circuit 27 is selected. Namely, when the first flow circuit 26 is selected, a flow amount of the engine cooling water at the point $C_1$ on the curve $L_1$ is obtained, and thus the amount of heat emitted at a point $D_1$ on the curve $M_1$, which corresponds to the point $C_1$ on the curve $L_1$, is obtained when the engine speed is 850 r.p.m. Contrary to this, when the second flow circuit 27 is selected, a flow amount of the engine cooling water at the point $C_2$ on the curve $L_2$ is obtained, and thus the amount of heat emitted at a point $D_2$ on the curve $M_2$, which corresponds to the point $C_2$ on the curve $L_2$, is obtained when the engine speed is 850 r.p.m. When the engine speed is 850 r.p.m., it is easily understood that the selection of the second flow circuit 27 can obtain an emission amount at the point $D_2$ on the line $M_2$ which is larger, by an amount b, than the heat emission amount at the point $D_1$ on the curve $M_1$ obtained if the first flow circuit 26 were selected. As a result, an increased heating efficiency in the cabin of a vehicle can be obtained regardless of a low engine speed under the idling condition.

It should be noted that the setting for switching between the first flow circuit 26 and the second flow circuit 27 is suitably determined from various factors, such as a characteristic of the water pump 7 of the automobile, a flow resistance of the heater core 5, and an amount of heat emitted from the heater core 5. The switching point is preferably a rotational speed of the engine, such as 1150 r.p.m., which substantially equalizes the heat emission amount when the first flow circuit 26 is selected ($X_1$ on the curve $M_1$) and the heat emission amount when the second flow circuit 27 is selected ($X_2$ on the curve $M_2$).

Figure 7:
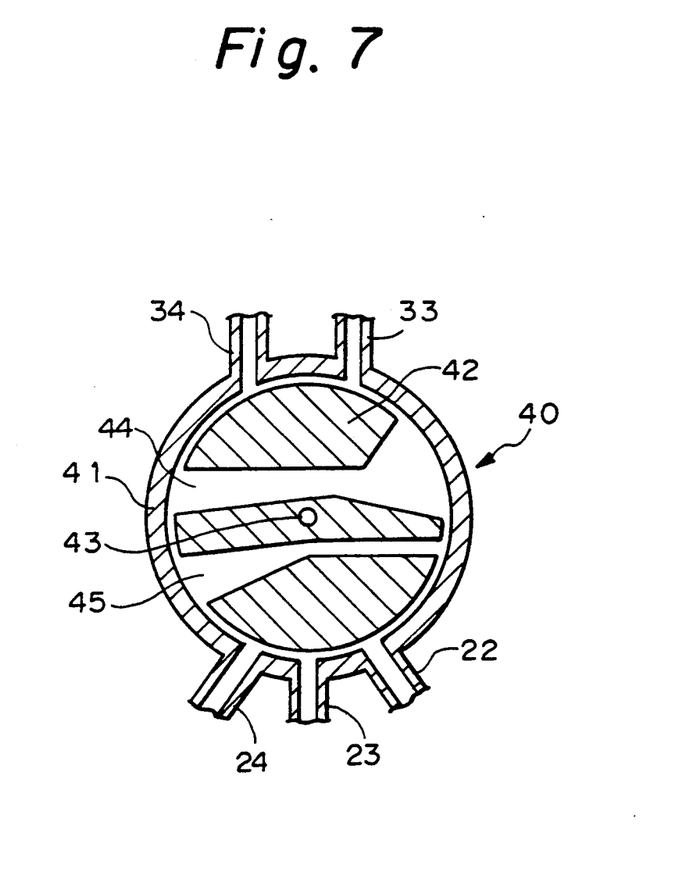
FIG. 7 shows a rotary type valve according to an embodiment of the present invention.
Figure 8:
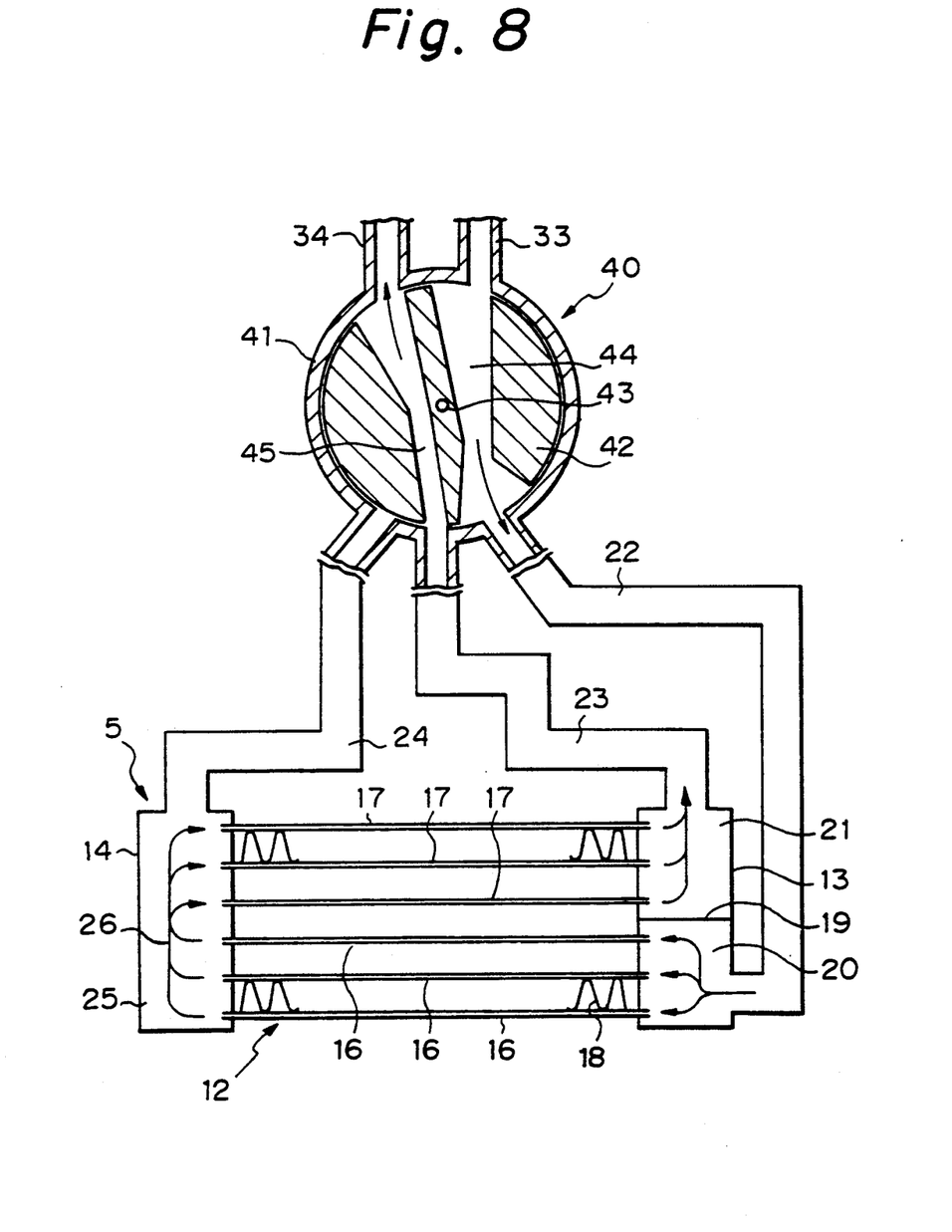
FIG. 8 shows a heat exchange system employing the rotary valve shown in FIG. 7.
Figure 9:
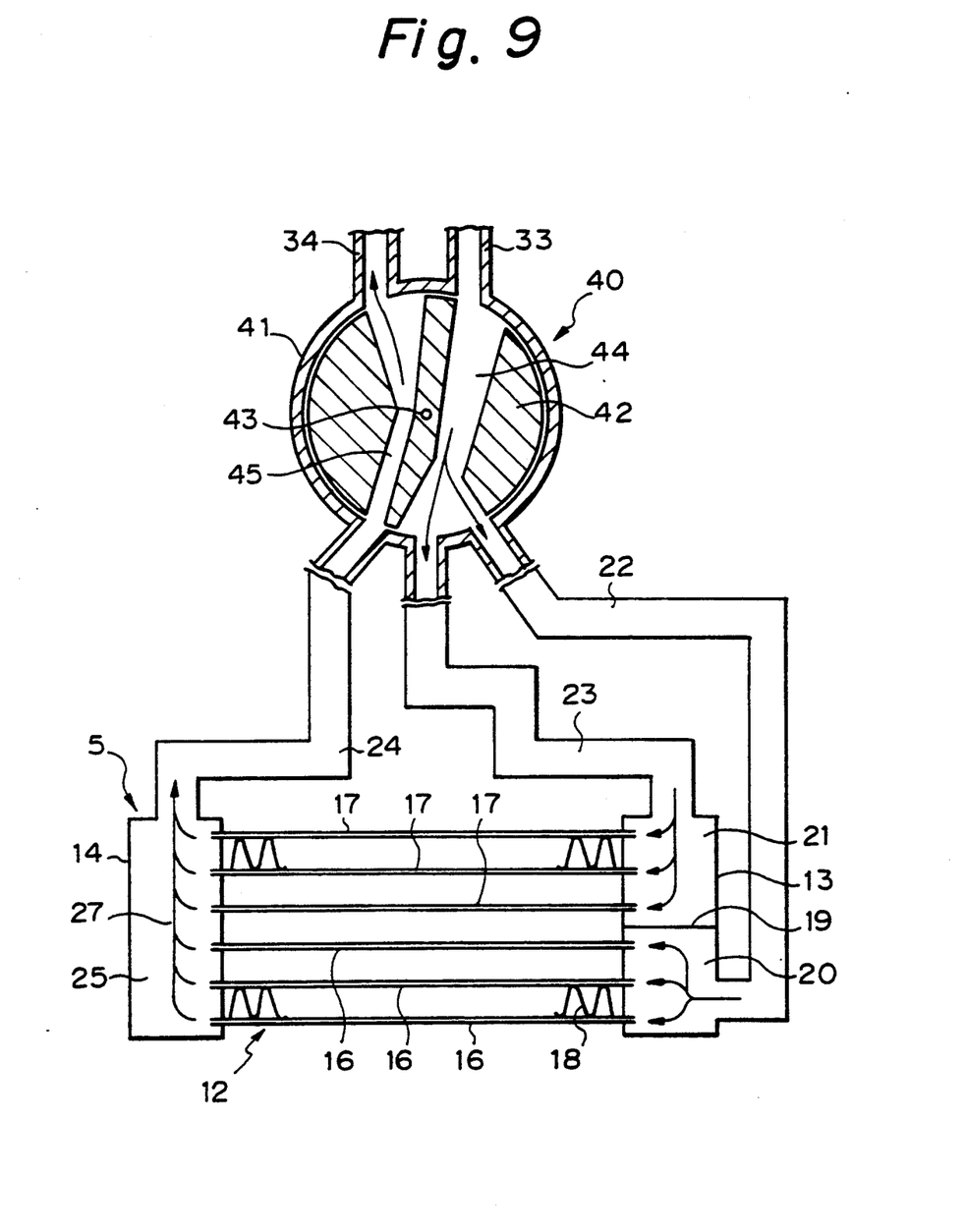
FIG. 9 is similar to FIG. 8, but illustrates the valve in a different position.

FIGS. 7 to 9 illustrate a second embodiment wherein a different construction of a switching valve 40, i.e., a rotary type, for switching between the first flow circuit 26 and a second flow circuit 27 is disclosed. In FIGS. 7 to 9, parts having functions similar to those in the first embodiment in FIGS. 1 to 5 have the same reference numbers, and a detailed explanation thereof is omitted. The valve 40 has a housing 41 and a rotor 42 arranged inside the housing 41. Connected to the housing 41 are a hot water supply pipe 33 and a hot water return pipe 34, and first, second and third hot water pipes 22, 23 and 24 having functions similar to those explained with reference to the first embodiment. The rotor 42 has a first opening 44 and a second opening 45 extending substantially radially therethrough, which are used for a selective communication of the pipes 22 to 34, and 33 and 34, as described later. The rotor 42 is provided with a drive shaft 43 connected to a rotary type actuator 29 not shown in FIG. 7. During a de-energized condition shown in FIG. 7, the valve 40 is closed and the rotor 42 is at an angular position as shown in FIG. 7, and thus all communication between the pipes 22 to 34, and 33 and 34 is blocked.

FIG. 8 or 9 shows a connection of the rotary valve 40 with the heater core 5. As in the first embodiment, the first hot pipe 22 is connected to the first chamber 20 of the first tank 13, and the second hot pipe 23 is connected to the second chamber 21 of the first tank 13. The third pipe 24 is connected to the chamber 25 of the second tank 14.

When the engine rotational speed is higher than a predetermined value, the actuator 29 operates the rotor 42 so that it takes an angular position as shown in FIG. 8, whereby the hot water supply pipe 33 is connected to the first hot water pipe 22 via the first opening 44, and the return pipe 34 is connected to the second hot .1 water pipe 23, while the third hot water pipe 24 is blocked. As a result, the first flow circuit (U-shaped flow) 26 is created in the heater core 5 as in FIG. 2 for the first embodiment, and accordingly, an increased amount of heat emission is obtained during the high engine rotational speed condition, to thus obtain an increased heating efficiency.

When the engine rotational speed is lower than a predetermined value, the actuator 29 operates the rotor 42 so that it takes an angular position as shown in FIG. 9, wherein the hot water supply pipe 33 is connected to both the first and second hot water pipes 22 and 23 via the first opening 44, and the return pipe 34 is connected to the third hot water pipe 23, via the opening 44, while the third hot water pipe 24 is connected to the return pipe 34 via the opening 45. As a result, the second flow circuit 27 is created in the heater core 5, as in FIG. 3 for the first embodiment, and accordingly, an increased amount of heat emission is obtained during the low engine speed condition, to thus obtain an increased heating efficiency.

Although the above embodiments are directed to a heater core for an air conditioning system for an automobile, the present invention can be utilized for a radiator for the engine.

In the embodiments as described, only one partition member 19 is arranged in the first tank 13, to obtain a U-shaped flow in the first flow circuit 26, but more than two partition members can be arranged in the first flow circuit 26 so that a serpentine-shaped flow as the first flow circuit 26 is created in the heater core 5.

In the first embodiment, the valve 15 provided with two spaced-apart lands 35 and 36 is employed, but a two-way switching valve having a single land can be employed.

As a modification, the partition 19 in the first tank can be movable between a position at which the separate chambers 20 and 21 are created and a position at which the chambers 20 and 21 are communicated with each other.

In the embodiments as described above, the engine rotational speed is used as an indication of the amount of hot water from the engine, but the amount of hot water can be directly detected. Furthermore, the temperature difference between two different locations in the heater core can be detected, to obtain the information on the hot water from the engine.

Although the embodiments are described with reference to the attached drawings, many modifications and changes can be made by those skilled in this art without departing from the scope and spirit of the invention.

I claim:

1. A hot water type heat exchange device connected to an internal combustion engine having a cooling water recirculating system provided with a water pump for a recirculation of a cooling water, comprising:
    a first tank;
    a second tank;
    a plurality of tubes for allowing a passage of hot water therethrough, each having first and second ends; said first ends of the tubes being connected to the first tank, and the second ends of the tubes being connected to the second tank;
    flow direction control means for switching between a first cooling water flow circuit wherein the cooling water from the recirculating system is introduced into the first tank and then into the second tank via a group of the tubes, then reintroduced into the first tank via a different group of tubes, and finally returned to flow circuit wherein the cooling water from the recirculating system is introduced into the first tank, then into the second tank via all of the tubes, and then returned to said recirculating system;
    means for detecting information related to an amount of engine cooling water flowing from the water pump, and;
    means, responsive to the obtained information related to the amount of the engine cooling water, for executing a switching by said flow direction control means between the first cooling water flow circuit and the second cooling water flow circuit.

2. A hot water type heat exchange device according to claim 1, wherein said switching means comprise means for determining whether the detected amount of engine cooling water is larger than a predetermined value, and switching means for causing the flow direction control means to switch to the first cooling water flow circuit when it is determined that the detected engine cooling water amount is larger than said predetermined value, and to switch to the second cooling water flow circuit when it is determined that the detected cooling water amount is smaller than said predetermined value.

3. A hot water type heat exchange device according to claim 1, wherein said detecting means comprise a sensor for detecting a rotational speed of said internal combustion engine.

4. A hot water type heat exchange device according to claim 3, wherein said switching means comprise means for determining whether the detected engine rotational speed is higher than a predetermined value, and switching means for causing the flow direction control means to switch to the first cooling water flow circuit when it is determined that the detected engine rotational speed is larger than said predetermined value, and to switch to the second cooling water flow circuit when it is determined that the detected engine rotational speed is smaller than said predetermined value.

5. A hot water type heat exchange device according to claim 1, wherein said flow direction control means comprise:
    at least one partition member for creating therein at least two chambers connected to different groups of said tubes;
    a switching valve for switching between a first position at which said first cooling water flow circuit is created, and a second position at which said second cooling water flow circuit is created, and;
    actuator means, responsive to the detected information, for executing a switching of said switching valve between said first and second positions.

6. A hot water type heat exchange device according to claim 5, wherein said switching valve comprises a cylindrical housing, a piston rod connected to said actuator for a linear reciprocal movement thereof, and pair of spaced apart lands fixed to said rod, the arrangement of the lands being such that, at said first position, the engine cooling water from the engine cooling water recirculating passageway is introduced into the first tank at a first chamber thereof and then introduced into the second tank, then introduced into the first tank at a second chamber thereof, and finally, returned to the engine cooling water recirculation system, and at said second position, the engine cooling water from the engine cooling water recirculating passageway is introduced into all of the chambers of the first tank, then introduced into the second tank via all of the tubes, and finally returned to the engine cooling water recirculation system.

7. A hot water type heat exchange device according to claim 5, wherein said switching valve comprises a cylindrical housing, a drive shaft connected to said actuator for a rotational movement, and a rotary valve member defining therein first and second openings therethrough, the arrangement of the openings being such that, at said first position, the engine cooling water from the engine cooling water recirculating passageway is introduced into the first tank at said first chamber thereof and then introduced into the second tank, then introduced into the first tank at said second chamber thereof, and finally, returned to the engine cooling water recirculation system, and at said second position, the engine cooling water from the engine cooling water recirculating passageway is introduced into all of the chambers of the first tank, then introduced into the second tank via all of the tubes, and finally, returned to the engine cooling water recirculation system.

8. A hot water type heat exchange device connected to an internal combustion engine having a cooling water recirculating system provided with a water pump for a recirculation of a cooling water, comprising:
- a first tank;
- a second tank;
- a plurality of tubes for allowing a passage of hot water therethrough, each having first and second ends; said first ends of the tubes being connected to the first tank and the second ends of the tubes being connected to the second tank;
- means for detecting a condition in which an amount of the engine cooling water from the water pump is smaller than an predetermined value, and;
- means for, upon detecting said condition, creating a straight flow of the hot water, wherein the cooling water from the recirculating system is introduced into the first tank, then into the second tank via all of the tubes, and finally, returned to said recirculating system.

* * * * *